US011668214B2

United States Patent
Ingram-Ogunwumi et al.

(10) Patent No.: US 11,668,214 B2
(45) Date of Patent: Jun. 6, 2023

(54) POROUS CERAMIC COMPOSITION, FILTER, AND ARTICLES

(71) Applicant: Corning Incorporated, Corning, NY (US)

(72) Inventors: Roychelle Sheneen Ingram-Ogunwumi, Painted Post, NY (US); Christopher Lane Kerr, Tioga, PA (US); Dell Joseph St Julien, Watkins Glen, NY (US); Lutz Franz Thomas Kercher, Corning, NY (US); Douglas Richard Wing, Corning, NY (US)

(73) Assignee: Corning Incorporated, Corning, NY (US)

( * ) Notice: Subject to any disclaimer, the term of this patent is extended or adjusted under 35 U.S.C. 154(b) by 656 days.

(21) Appl. No.: 16/060,724

(22) PCT Filed: Dec. 7, 2016

(86) PCT No.: PCT/US2016/065422
§ 371 (c)(1),
(2) Date: Jun. 8, 2018

(87) PCT Pub. No.: WO2017/100345
PCT Pub. Date: Jun. 15, 2017

(65) Prior Publication Data
US 2018/0361299 A1  Dec. 20, 2018

Related U.S. Application Data

(60) Provisional application No. 62/265,219, filed on Dec. 9, 2015.

(51) Int. Cl.
*F01N 3/022* (2006.01)
*B01D 46/24* (2006.01)
(Continued)

(52) U.S. Cl.
CPC ....... *F01N 3/0222* (2013.01); *B01D 46/2429* (2013.01); *B01D 46/2474* (2013.01);
(Continued)

(58) Field of Classification Search
None
See application file for complete search history.

(56) References Cited

U.S. PATENT DOCUMENTS 4,233,351 A   11/1980  Okumura et al.
5,634,952 A    6/1997  Kasai et al.
(Continued)

FOREIGN PATENT DOCUMENTS

CN   101124029 A   2/2008
CN   101484403 A   7/2009
(Continued)

OTHER PUBLICATIONS

Dmitriev, "Surface porosity and permeability of porous media with a periodic microstructure," Fluid Dynamics 3(1) 1995, pp. 64-69.
(Continued)

*Primary Examiner* — Christopher P Jones
*Assistant Examiner* — Phillip Y Shao
(74) *Attorney, Agent, or Firm* — Joseph M. Homa

(57) ABSTRACT

The present disclosure relates to porous ceramic compositions and porous ceramic articles, such as honeycomb structure bodies and porous ceramic filters. In various embodiments, a particulate filter is disclosed herein; in some of these embodiments, the particulate filter is a gasoline particulate filter (GPF) and is suitable for use with a gasoline engine and treating its exhaust, and in some of the embodiments, the particulate filter is a diesel particulate filter (DPF) and is suitable for use with a diesel engine and treating its exhaust.

27 Claims, 7 Drawing Sheets

(51) Int. Cl.
*C04B 38/00* (2006.01)
*C04B 111/00* (2006.01)

(52) U.S. Cl.
CPC ... *B01D 46/2482* (2021.08); *B01D 46/24491* (2021.08); *B01D 46/24492* (2021.08); *B01D 46/24494* (2021.08); *C04B 38/0006* (2013.01); *C04B 2111/00793* (2013.01); *F01N 2330/06* (2013.01)

(56) References Cited

U.S. PATENT DOCUMENTS

| | | |
|---|---|---|
| 6,818,580 B2 | 11/2004 | Kumazawa et al. |
| 6,864,198 B2 | 3/2005 | Merkel |
| 7,141,087 B2 | 11/2006 | Noguchi et al. |
| 7,179,316 B2 | 2/2007 | Merkel |
| 7,294,164 B2 | 11/2007 | Merkel |
| 7,520,911 B2 | 4/2009 | Beall et al. |
| 7,648,548 B2 | 1/2010 | Miao et al. |
| 7,802,478 B2 | 9/2010 | Dill et al. |
| 7,923,093 B2 | 4/2011 | Melscoet-Chauvel et al. |
| 8,444,739 B2 | 5/2013 | Mizuno et al. |
| 8,450,227 B2 | 5/2013 | McCauley et al. |
| 8,475,557 B2 | 7/2013 | Boger et al. |
| 8,673,207 B1 | 3/2014 | Boger et al. |
| 8,815,189 B2 | 8/2014 | Arnold et al. |
| 8,926,875 B2 | 1/2015 | Spetseris et al. |
| 8,956,436 B2 | 2/2015 | Divens-Dutcher et al. |
| 9,334,191 B2 | 5/2016 | Miao et al. |
| 9,415,344 B2 | 8/2016 | Arnold et al. |
| 2004/0261384 A1* | 12/2004 | Merkel ............ B01D 46/2429 264/640 |
| 2007/0107397 A1 | 5/2007 | Merkel et al. |
| 2007/0119135 A1 | 5/2007 | Miao et al. |
| 2008/0047243 A1 | 2/2008 | Beall et al. |
| 2012/0107228 A1 | 5/2012 | Ishida et al. |
| 2012/0134891 A1 | 5/2012 | Boger et al. |
| 2012/0135186 A1 | 5/2012 | Beall et al. |
| 2014/0338296 A1 | 11/2014 | Backhaus-Ricoult et al. |
| 2015/0107228 A1 | 4/2015 | Klingmann |
| 2015/0143786 A1 | 5/2015 | Merkel et al. |
| 2015/0251335 A1 | 9/2015 | Chapman et al. |
| 2015/0260064 A1 | 9/2015 | Majkowski et al. |
| 2019/0009254 A1* | 1/2019 | Clowes ............ F01N 3/2803 |

FOREIGN PATENT DOCUMENTS

| | | |
|---|---|---|
| CN | 102171164 A | 8/2011 |
| CN | 102918005 A | 2/2013 |
| CN | 103080047 A | 5/2013 |
| CN | 103249692 A | 8/2013 |
| CN | 103282327 A | 9/2013 |
| CN | 103582619 A | 2/2014 |
| CN | 104995154 A | 10/2015 |
| EP | 1502661 B1 | 12/2009 |
| EP | 2502661 A2 | 9/2012 |
| EP | 2617696 A1 | 7/2013 |
| EP | 2650042 A1 | 10/2013 |
| EP | 2158956 B1 | 10/2014 |
| GB | 2497442 A | 6/2013 |
| JP | 2010110750 A | 5/2010 |
| JP | 2010214335 A | 9/2010 |
| JP | 2014-505646 A | 3/2014 |
| JP | 2015-526379 A | 9/2015 |
| WO | 2006015240 A2 | 2/2006 |
| WO | 2011/133503 A2 | 10/2011 |
| WO | 2011150145 A1 | 12/2011 |
| WO | 2014028207 A1 | 2/2014 |
| WO | 2014/085325 A1 | 6/2014 |

OTHER PUBLICATIONS

Chinese Patent Application No. 201680072638.3; English Translation of the First Office Action dated Jan. 20, 2020; China Patent Office; 8 pgs.

Indian Patent Application No. 201817021556; First Examination Report dated Oct. 31, 2019; India Patent Office; 6 pgs.

Global Dossier Translation of JP2018530527 Office Action dated Jun. 10, 2020; 3 Pages; Japanese Patent Office.

International Search Report and Written Opinion of the International Searching Authority; PCT/US2016/065422; dated Apr. 10, 2017; 12 Pages; European Patent Office.

Chinese Patent Application No. 201680072638.3 Office Action dated Dec. 10, 2020; 9 Pages (English Translation Only) Chinese Patent Office.

* cited by examiner

POROUS CERAMIC COMPOSITION, FILTER, AND ARTICLES

CROSS-REFERENCE TO RELATED APPLICATIONS

This application is a national stage application under 35 U.S.C. § 371 of International Patent Application Serial No. PCT/US2016/065422, filed on Dec. 7, 2016, which claims the benefit of priority of U.S. Provisional Application Ser. No. 62/265,219 filed on Dec. 9, 2015, the contents of both are relied upon and incorporated herein by reference in their entireties.

BACKGROUND

Field

The present specification generally relates to porous ceramic materials and porous ceramic articles, including bodies comprising a honeycomb structure such as porous ceramic filters comprised of plugged honeycomb structure bodies.

Technical Background

The drive for higher fuel efficient gasoline vehicles has led to proliferation of lean burn Gasoline Direct Injection (GDI) technology due to their increased power and lower fuel consumption relative to multi-port injection engines. However, GDI engines can produce very fine soot when in operation. On road driving conditions will vary, which presents more of a challenge to reduce particle number (PN).

Accordingly, a need exists for pollution abatement for vehicles such as GDI engine vehicles, including a means of capture and removal of these fine particles from the engine exhaust.

SUMMARY

The present disclosure relates to porous ceramic compositions and porous ceramic articles, such as honeycomb structure bodies and porous ceramic filters. In various embodiments, a particulate filter is disclosed herein; in some of these embodiments, the particulate filter is suitable as a gasoline particulate filter (GPF) and is suitable for use with a gasoline engine and treating its exhaust, and in some of the embodiments, the particulate filter is a diesel particulate filter (DPF) and is suitable for use with a diesel engine and treating its exhaust.

In some embodiments, the GPF disclosed herein comprises porosity, pore size, and surface porosity, and in some of these embodiments, other properties and/or characteristics are suitable for use in gasoline exhaust particulate removal. For example, some embodiments disclosed herein exhibit low pressure drop, which translates into increased fuel economy over existing high porosity compositions, wherein a lower pressure drop may be provided by one or more of the following: fewer fine pores, for example by a pore size distribution having high d10, which can improve coated pressure drop; high near-surface porosity, which can increase wall permeability and coatability; low d50 and/or low d90, which can improve filtration efficiency; narrow pore size distribution which can minimize an increase of pressure drop from bare to coated state, thus the filter may provide more washcoat capacity; higher isostatic strength sufficient for canning.

In some embodiments, the washcoat material is comprised of three-way catalyst TWC material, selective catalytic reduction (SCR) material, or a combination thereof.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
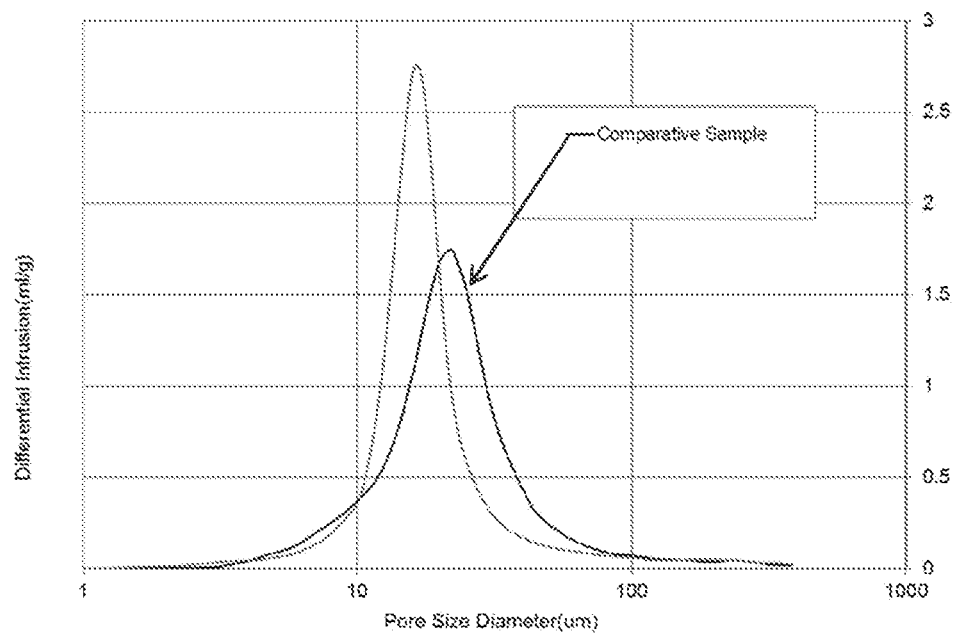
FIG. 1 schematically depicts a pore size distribution of an exemplary porous ceramic material "A" disclosed herein alongside the pore size distribution of a comparative material "B".

Reference will now be made in detail to embodiments of porous ceramic compositions and porous ceramic articles, such as honeycomb structure bodies and porous ceramic filters, embodiments of which are illustrated in the accompanying drawings. Whenever possible, the same reference numerals will be used throughout the drawings to refer to the same or like parts.

As used herein, a "wt %," "weight percent," or "percent by weight" of an inorganic component in a ceramic batch mixture, unless specifically stated to the contrary, is based on the total weight of the total inorganics in which the component is included. Organic components are specified herein as superadditions based upon 100% of the inorganic components used.

For example, in some embodiments disclosed herein, a 300 cpsi 8 mil wall thickness filter comprised of >60% porosity cordierite composition as disclosed herein has sufficient isostatic strength for canning. Modulus of rupture (MOR), or flexural strength, values herein were measured at room temperature by the four-point method on a sample cellular bar (1 inch×½ inch×5 inch long) parallel to the axial direction of the honeycomb article. Elastic modulus values were measured at room temperature, using a sonic resonance technique, also on a cellular bar (1 inch×½ inch×5 inch long) and parallel to the axial direction in accordance with ASTM C 1198-01 or as described in co-pending U.S. patent application Ser. No. 11/823,138 filed Jun. 27, 2006 and entitled "Methods and Apparatus For Measuring Elastic Modulus Of Non-Solid Ceramic Materials By Resonance," the disclosure of which is hereby incorporated by reference herein.

In various embodiments, a cordierite composition is disclosed herein comprising high porosity with a narrow pore size distribution and relatively high near-surface porosity. Embodiments are disclosed that can provide low pressure drop and high filtration efficiency, for example when implemented in a filter body such as a honeycomb structure body comprised of a matrix of walls, and the composition can comprise a narrow pore size distribution, with narrowness on the fine end that helps to improve coated pressure drop and with narrowness on the coarse end that helps to increase filtration efficiency; additionally these embodiments preferably comprise a near-surface porosity that is similar to the below surface porosity that helps to improve coatability and flow through the porous ceramic material.

In various embodiments, a porous ceramic wall-flow filter is disclosed herein comprising walls comprised of a porous ceramic material comprising high porosity with a narrow pore size distribution and relatively high near-surface porosity. Embodiments are disclosed that provide low pressure drop and high filtration efficiency and comprise a narrow pore size distribution, with narrowness on the fine end that helps to improve coated pressure drop and with narrowness on the coarse end that helps to increase filtration efficiency; additionally these embodiments preferably comprise a near-surface porosity that is similar to the surface porosity in the middle of the wall that can help to improve coatability (such as by coating with catalytic washcoat) and flow through the porous ceramic material of the walls. In various embodiments, the higher near-surface porosity at or near the surface of the walls of the filter body minimizes or lowers or reduces the backpressure of a through-wall filter body while still providing filtration efficiency even with a low median pore size and tight pore distribution.

In one exemplary set of embodiments disclosed herein, a particulate filter comprises porous ceramic walls comprising a total porosity of 63-67%, a median pore diameter d50 of 16 to 19 µm, inclusive, df<0.40, and a near-surface porosity that is within 5% of (not more than 5% greater than and not less than 5% lesser than) the porosity in the middle 30% of the wall; in some of these embodiments, the filter has a cell geometry of 300 cpsi (cell per square inch) with 8 mil wall thickness.

In another exemplary set of embodiments disclosed herein, a porous ceramic filter comprises a plugged, wall-flow honeycomb filter body comprised primarily of cordierite and having a plurality of longitudinal walls defining a plurality of cell channels extending from a frontal inlet end to an outlet end of the body, wherein at least some of the cell channels are plugged, such as at the inlet end, or at the outlet end, between the inlet and outlet ends, or a combination thereof, wherein the walls comprise a narrow pore size distribution, such as a pore size distribution described by: (a) a high d10 (which can provide a low washcoated backpressure), for example wherein d10>9 µm, preferably >10 µm, more preferably >11, or even more preferably >12 µm (b) a d50>15 µm and <20 µm, in some embodiments >16 µm and <19 µm, and in other embodiments >16.5 µm and <18.5 µm, (c) a low d90 which can provide enhanced filtration efficiency, wherein d90<38 µm, preferably <35 µm, more preferably <32 µm, and even more preferably <29 µm, and (d) high porosity, for example >55%, in some embodiments between 60% and 70%, in some embodiments between 62% and 68%, and in some embodiments between 63% and 67%, and in other embodiments porosities of 67 to 75%. In some of these embodiments, the d90 of the walls is from 25 to 38 µm inclusive, and in some of these embodiments from 25 to 35 µm inclusive, and in other embodiments from 30 to 33 µm, inclusive.

In the embodiments disclosed herein, the pore size distribution of the ceramic material has a low end of the distribution as characterized by or measured by the d-factor, $d_f=(d50-d10)/d50$, wherein preferably $d_f<0.50$, more preferably <0.45, even more preferably <0.40, and in some embodiments <0.35; with a low d-factor, such narrow distribution can help with providing improved pressure drop when coated with catalyst. Furthermore, in embodiments disclosed herein, the coarse tail of the pore distribution as characterized by or measured by the breadth of the distribution, $d_b=(d90-d10)/d50$, wherein $d_b$ is preferably less than about 1.15, more preferably <1.0, in some embodiments <0.9 or in some embodiments <0.8; such coarse tail can help with influencing filtration efficiency, and in some embodiments it is advantageous to provide a narrow overall pore distribution.

In various sets of embodiments, a particulate filter is disclosed herein; in some of these embodiments, the particulate filter is a gasoline particulate filter, and in some of the embodiments, the particulate filter is a diesel particulate filter. In some of these embodiments the particulate filter is a GPF comprising: (a) a cell geometry of 190 and 320, inclusive, cells per square inch (cpsi) and cell wall thicknesses of 6 to 12 mils, inclusive; (b) a wall porosity of >62% or in some embodiments >63%; (c) an MOR>150 psi, preferably >165 psi, more preferably >180 psi, and even more preferably >195 psi, and in various embodiments MOR is large enough to be sufficient to allow handling or canning of the fired part; (d) isostatic compressive strength (ISO) for the filter body such that ISO>10 Bar, or >10.5 Bar, or preferably >12 Bar, or even more preferably >15 Bar, and in various embodiments ISO is sufficiently high for a body with as-extruded skin to provide enhanced canning survivability; and (e) a near-surface porosity that is similar to the bulk porosity at the mid-point of the wall (or web), wherein preferably the minimum porosity measured at any point from the surface of the wall and perpendicularly into the web to within 15 µm of the web surface is at least 90% of (or no more than 10% less than) the average porosity of the middle 30% ("average mid web porosity") of the wall or web, more preferably at least 95% of (or no more than 5% less than) the average mid web porosity as measured by x-ray tomography. In some embodiments, the minimum near-surface porosity is >60%, and in some of these embodiments >62%, such as to enable efficient catalyst coating, or low pressure drop, or both. In some embodiments, a high near-surface porosity can help to provide a reduced coated backpressure.

Surface or near-surface porosity can be measured by x-ray tomography which was the technique used herein. We have found that X-ray tomography produces a truer three dimensional image across the width of the wall, and even across the entire width of the wall. The use of x-ray tomography facilitated the discovery of compositions that yields high near-surface porosity and that also simultaneously yield high isostatic strength, low backpressure, as well as the other attributes described herein.

The ceramic bodies, such as ceramic honeycombs or ceramic honeycomb bodies, described herein are preferably primarily cordierite in phase. The cordierite phase is preferably produced by reaction of precursors, such as by reaction sintering.

We have found that coarse precursor materials, such as coarse talcs and silicas, as batch components, may yield good strength but the large pores that can result, for example as characterized by pore distribution d90, generally put the pore distribution at the coarse end outside the range that is useful for particulate filters, like gasoline particular filters. We have also found that fine silicas may yield pore distributions which have values of d10 and/or d50 outside the useful range for particulate filters, like GPF's, which may be compensated by modifications in the firing schedules. We have also found that highly cross-linked starches, and specifically narrow particle size highly cross-linked pea and potato starches, can provide some of the narrowest distributions and also good processability. Generally, narrow particle size precursors are utilized, but even more preferably, specific combinations of precursors are utilized to yield narrow pore size, sufficient isostatic strength, and surface porosity in the useful range which were heretofore unknown. In various embodiments disclosed herein, the ceramic precursor material components can comprise: talcs or blends of talcs possessing a particle dps50 less than about 30 μm, preferably between 15 and 30 μm, inclusive, more preferably between 15 and 25 μm, inclusive, even preferably between 17 and 23 μm, inclusive, and possessing a particle dps90 less than about 60 μm, more preferably less than 50 μm, and more preferably less than 45 μm; in some of these embodiments, the talc(s) possess a particle dps90 between 25 and 60 μm, inclusive, and in other embodiments a particle dps90 of between 35 and 45 μm, inclusive; in some embodiments, a crystalline silica is employed with a particle dps50 of between 20 and 30 μm, inclusive, more preferably between 25 and 30 μm, inclusive, a dps90 less than about 60 μm, and a particle size distribution breadth, $dps_b$=(dps90−dps10)dps50 less than about 2 μm, more preferably less than 1.6 μm, and even more preferably between 1.0 and 1.6 μm, inclusive. In one set of embodiments, a talc blend possessing a dps50 of about 22 μm and a dps90 of about 43 μm is combined with a silica possessing a dps50 of about 28 μm and $dps_b$ of about 1.51 to produce an article with a pore distribution and strength suitable for a particulate filter such as a GPF.

We have also found that silica particles with a smaller dps50 in the batch may provide pore sizes in the final fired article in a desired range although may not impart sufficient strength, although modifications may be made to the firing schedule, while silica particles with coarser distributions provide sufficient strength but yield a pore d90 which may be greater than desired. In some embodiments, we have found that preferably a combination of a cross-linked pea starch with silica possessing a narrow distribution in the batch can provide sufficient strength, surface porosity, and proper pore distribution in the fired article. In other embodiments, a combination of highly cross-linked pea starch with fine silica or an unwashed highly cross-linked potato starch with a finer silica may also be used in the batch. In some embodiments, the combination of a small amount of fine silica with a coarser silica with narrow particle distribution was utilized in the batch, such as combinations of a fine silica with dps50 of about 5.3 μm with a coarse silica possessing dsp50 of 27.4 μm in a ratio of 1 part fine silica to 9 parts coarse silica yielding a bimodal mixture of fine and coarse silica particles. Though not seeking to be or needing to be bound by theory, it is thought that this mixture may particularly advantageously provide a low temperature reactivity with the fine silica while providing a coarse silica that enhances the pore microstructure when fired to temperatures exceeding about 1400° C. In various embodiments, blends of fine and coarse silica may be used in the batch that include fine silica content of 0 to 50 wt %, preferably 0 to 30 wt %, more preferably 5 to 30 wt % and even more preferably 5 to 20 wt %.

We have also found that various embodiments disclosed herein can provide high strength and low thermal expansion coefficient (CTE), and may be most readily achieved with a blend of fine and coarse aluminas, such as Alumina A and Alumina B in Table 1 listing of batch raw material components, where the fine alumina dsp50 is preferably less than 1 μm.

TABLE 1

| Raw Material | Median Particle Diameter (μm) |
| --- | --- |
| Talc A | 19.8 |
| Talc B | 24.3 |
| Alumina A | 7.2 |
| Alumina B | 0.539 |
| Alumina Hydroxide A | 12.2 |
| Alumina Hydroxide B | 4.51 |
| Kaolin | 2.8 |
| Quartz A | 4.61 |
| Quartz B | 26.9 |
| Quartz C | 27.4 |
| Graphite A | 40.7 |
| Starch A | 26.2 |
| Starch B | 49.7 |

The presence of the fine alumina has been found to be especially advantageous at a fine to coarse ratio of greater than 1:10 by weight and less than about 1:1 less fine than coarse), preferably a ratio between 1:7 and 1:2, inclusive, fine to coarse. Although higher and lower levels of fine alumina are contemplated herein as being useful, at very high levels of fine alumina, above about 1:1, it is more difficult to achieve or maintain the median pore diameter, d50, and fine tail, as measured by d10, within the desired range for the fired article. Table 3 lists the physical properties of exemplary embodiments as disclosed herein.

TABLE 3

Physical Properties of Exemplary Embodiment Samples

| | Composition Number | | | | | | | | | | |
|---|---|---|---|---|---|---|---|---|---|---|---|
| | 1 | 2 | 3 | 4 | 5 | 6 | 7 | 8 | 9 | 10 | 11 |
| % porosity | 66.7 | 63.5 | 64.3 | 65.4 | 66 | 65.4 | 63.9 | 66.4 | 64.8 | 64.9 | 65.3 |
| d10 (um) | 10.98 | 11.6 | 11.08 | 11.03 | 10.5 | 10.98 | 11.44 | 9.24 | 10.8 | 11.7 | 11.38 |
| d50 (um) | 16.7 | 17.4 | 16.7 | 16.9 | 17.3 | 16.7 | 17.4 | 17.8 | 17.1 | 16.6 | 18 |
| d90 (um) | 33.3 | 38.6 | 37.7 | 36.8 | 34.7 | 28.4 | 38.2 | 33.2 | 33.5 | 30.6 | 34.7 |
| dfactor | 0.34 | 0.35 | 0.34 | 0.35 | 0.39 | 0.34 | 0.34 | 0.48 | 0.37 | 0.29 | 0.36 |
| MOR (psi) | 200.8 | 179.5 | 200.9 | 191.4 | 178.1 | 174.3 | 192.8 | 202.1 | 225 | 188 | 205.7 |
| coated MOR (psi) | | | | | | | | | | | |
| CTE RT-800° C. (10 – 7/° C.) | 11.3 | 6.5 | 8.4 | 9.3 | 10.6 | 8.7 | 8 | 10.3 | 10.4 | 8.4 | 10.7 |
| coated CTE RT-800° C. (10 – 7/° C.) | 11.1 | | | | | | | 10.1 | | | |
| RT Emodulus (Mpsi) | 0.239 | 0.248 | 0.272 | 0.242 | 0.233 | 0.233 | 0.258 | 0.256 | | 0.272 | |
| coated RT Emodulus (Mpsi) | | | | | | | | | | | |
| Firing cycle soak T (° C.) | 1410 | 1425 | 1425 | 1420 | 1415 | 1425 | 1425 | 1410 | 1415 | 1425 | 1415 |
| Firing cycle ramp rate (° C./hr) | 35 | 65 | 65 | 40 | 35 | 55 | 65 | 35 | 65 | 55 | 65 |

Table 4 lists the batch raw material components for comparative examples and Table 5 lists the corresponding physical properties of the comparative examples.

TABLE 4

Batch Composition Mixtures - Comparative Examples

| | Composition Number | | | | | | | | |
|---|---|---|---|---|---|---|---|---|---|
| | 1 | 2 | 3 | 4 | 5 | 6 | 7 | 8 | 9 |
| Talc A | 7.75 | 17.35 | 0 | 0 | 38.56 | 38.87 | 19.94 | 39.24 | 17.35 |
| Talc B | 30.99 | 21.41 | 41.54 | 40.6 | 0 | 0 | 19.93 | 0 | 21.41 |
| Alumina A | 13.84 | 13.95 | 28.03 | 14.7 | 12.88 | 14.52 | 13.19 | 13.28 | 13.95 |
| Alumina B | 0 | 0 | 0 | 0 | 0 | 0 | 6.59 | 3.32 | 0 |
| Alumina Hydroxide A | 18.6 | 18.6 | 0 | 18.6 | 12.9 | 11.47 | 10.2 | 15 | 18.6 |
| Alumina Hydroxide B | 0 | 0 | 0 | 0 | 6.22 | 5.53 | 0 | 0 | 0 |
| Kaolin | 13.65 | 13.39 | 13.85 | 11.7 | 14.9 | 14.9 | 14.9 | 13.7 | 13.39 |
| Quartz A | 0 | 0 | 0 | 0 | 14.54 | 14.71 | 1.52 | 0 | 15.3 |
| Quartz B | 15.17 | 15.3 | 16.59 | 14.4 | 0 | 0 | 0 | 0 | 0 |
| Quartz C | 0 | 0 | 0 | 0 | 0 | 0 | 13.73 | 15.46 | 0 |
| Graphite A | 16 | 15 | 16 | 0 | 17.5 | 0 | 12.5 | 12.5 | 15 |
| Starch A | 0 | 0 | 0 | 0 | 0 | 15.8 | 25.5 | 22.5 | 24 |
| Starch B | 26 | 24 | 26 | 0 | 22.5 | 0 | 0 | 0 | 0 |
| Starch C | 0 | 0 | 0 | 10 | 0 | 0 | 0 | 0 | 0 |

TABLE 5

Physical Properties of Comparative Examples

| | Composition Number | | | | | | | | |
|---|---|---|---|---|---|---|---|---|---|
| | 1 | 2 | 3 | 4 | 5 | 6 | 7 | 8 | 9 |
| % porosity | 66 | 64.9 | 65 | 51.1 | 65.6 | 54.7 | 64 | 63.6 | 66.4 |
| d10 (um) | 10.4 | 8.2 | 9.29 | 10.98 | 7.3 | 8.93 | 9.55 | 10.85 | 9.18 |
| d50 (um) | 21.4 | 20.1 | 20.4 | 19.5 | 15.7 | 13.4 | 14.6 | 17.2 | 15.7 |
| d90 (um) | 44.5 | 41.9 | 43.2 | 40.6 | 32.6 | 23.6 | 33.9 | 32.7 | 30.2 |
| dfactor | 0.52 | 0.59 | 0.54 | 0.44 | 0.54 | 0.33 | 0.35 | 0.37 | 0.42 |
| MOR (psi) | 254.7 | 248.3 | 233.7 | 248.4 | 299.4 | 203.1 | 159.5 | 149.7 | 100 |
| coated MOR (psi) | | | | | | 216.1 | | | |
| CTE RT-800° C. (10 – 7/° C.) | 10.8 | 9.8 | 10.7 | 6 | 14.3 | 8.4 | 6.7 | 6.6 | 10 |
| coated CTE RT-800° C. (10 – 7/° C.) | 10.8 | | | | | 8.1 | | | |
| RT Emodulus (Mpsi) | | 0.306 | 0.314 | 0.393 | | 0.348 | 0.242 | | |
| coated RT Emodulus (Mpsi) | | | | | | 0.343 | | | |

TABLE 5-continued

Physical Properties of Comparative Examples

| | Composition Number | | | | | | | | |
|---|---|---|---|---|---|---|---|---|---|
| | 1 | 2 | 3 | 4 | 5 | 6 | 7 | 8 | 9 |
| Firing cyle soak T (° C.) | 1401 | 1410 | 1401 | 1428 | 1395 | 1425 | 1425 | 1425 | 1407 |
| Firing cycle ramp rate (° C./hr) | 13 | 20 | 13 | 65 | 35 | 65 | 55 | 50 | 40 |

In various embodiments disclosed herein, we have found that a balance between isostatic strength and filter backpressure may be achieved with cellular ceramic bodies comprising cell densities of preferably between about 180 cpsi and 320 cpsi, although cell densities as low as 100 cpsi and as high as 400 or even 500 cpsi are contemplated herein. With these cell densities, preferably the wall thicknesses are between 5 to 20 mils, inclusive, more preferably between 6 and 16 mils, and in some embodiments between 6 and 12 mils, inclusive, and in others between 7 and 10 mils, inclusive, and in a subset of these embodiments between 7 and 9 mils, inclusive. In one set of embodiments, a porous ceramic honeycomb article comprises wall thicknesses between about 7 and 9 microns, inclusive, combined with bulk wall porosities of 63 to 67% and a pore size distribution having pore d50 of 16 to 19 microns, inclusive, which can provide low backpressure with good coated filtration efficiency and sufficient strength for GPF applications, such as when formed using the precursor raw materials and firing disclosed herein.

In some embodiments disclosed herein, the porous ceramic cellular body is provided with selectively thickened peripheral cell walls, which can help to improve isostatic strength of the ceramic article.

In some embodiments disclosed herein, the porous ceramic cellular body is provided with an as-extruded skin, i.e. the peripheral wall surrounding the matrix of intersecting walls was extruded simultaneously with extrusion of the walls when forming the green body that is fired into a porous ceramic article.

In some embodiments disclosed herein, the porous ceramic cellular body comprises both an as-extruded skin and selectively thickened peripheral cell walls; in some of these embodiments, the isostatic strength is greater than 10 bar, in some embodiments >10.5 bar, in some embodiments >12 bar, and in other embodiments >15 bar. Embodiments of a porous honeycomb ceramic article having high isostatic strength with the microstructure disclosed herein would be advantageous, for example as being durable during a catalytic washcoat process yet being able to sustain advantageous amounts of a washcoat material.

In some embodiments disclosed herein, a particulate filter comprises a filter body comprising plurality of walls comprising wall thickness which increases towards the outer periphery of the filter body; in some of these embodiments, the wall thickness increases starting at about 5 cells from the outer skin and reaches a maximum wall thickness at that outer skin. Thickening of the walls at the periphery can help to increase isostatic strength of the filter, some embodiments exhibiting an isostatic strength in excess of 10 Bar. In an exemplary embodiment, the particulate filter comprises a web thickness of 8 mils for walls throughout the majority of the body, and comprises walls with thickness increased to 8.5 mil at a location 5 cells from the outer periphery, 9 mils at a location 4 cells from the periphery, 9.5 mils at a location 3 cells from the periphery, 10 mils at a location 2 cells from the periphery, and 10.5 mils in the outermost cells directly adjacent to the peripheral skin. Various geometries are contemplated herein, and this example is not meant to be limiting in the number of cells from the periphery that possess thicker walls than the interior. In one set of embodiments, walls having thicknesses greater than the majority of the walls of the particulate filter are disposed in a location between 10 cells and 2 cells, inclusive, of the peripheral skin. In some embodiments, the second cell walls increase in thickness in increments ranging in spans of between about 0.2 mil and 3 mil, inclusive, and in some embodiments between 0.3 and 1.0 mils, inclusive. Similarly, the increments in wall thickness from the first thickened wall to the peripheral skin can be in the range of 0 mil to 6 mils, or in other embodiments in the range of 1.5 to 5 mils.

In use, a particulate filter is subject to frequent and rapid heating and cooling cycles and must be tolerant to thermal shock. For porous cordierite bodies, CTE and MOR are often related in that values of CTE below about $15 \times 10\text{-}7/°$ C. are associated with acceptable microstructure including grain orientation, porosity and micro-cracking. Lower values of CTE are preferred in order to provide enhance thermal shock tolerance to the honeycomb structure. Preferably the CTE of the porous ceramic article is less than $12 \times 10\text{-}7/°$ C., more preferably CTE<$10 \times 10\text{-}7/°$ C., and even more preferably CTE<$9 \times 10\text{-}7/°$ C., for uncoated ceramic articles. Upon application of a catalyst washcoat, the CTE may rise by $2 \times 10\text{-}7/°$ C., or $3 \times 10\text{-}7/°$ C., or $5 \times 10\text{-}7/°$ C. which can result in making the coated filter less thermal shock tolerant. We have found that the filters disclosed herein, with properties so described, exhibit minimal change in CTE when coated as compared to bare uncoated filter material/bodies. Thus, coated filters disclosed herein may exhibit a CTE that is less than less than $5 \times 10\text{-}7/°$ C. to $12 \times 10\text{-}7/°$ C. greater than the bare, uncoated filter, preferably less than $4 \times 10\text{-}7/°$ C. to $12 \times 10\text{-}7/°$ C. greater than the bare uncoated filter, more preferably less than $2 \times 10\text{-}7/°$ C. to $12 \times 10\text{-}7/°$ C., and most preferably less than $1 \times 10\text{-}7/°$ C. to $12 \times 10\text{-}7/°$ C. greater than the bare uncoated filter. Although not seeking to be or needing to be bound by theory, this is thought to be due at least in part to the uniform pore microstructure across the web and to the relatively low degree of micro cracking observed in the bodies disclosed herein.

The ceramic articles disclosed herein in various embodiments comprise gasoline particulate filters comprising surface and near surface porosity and bulk microstructure well-suited for catalytic washcoat loading of >24 g/liter, or in some embodiments >30 g/liter, or in some embodiments >50 g/liter, or even >75 g/liter. The microstructure described herein can provide sufficiently low backpressure and high filtration efficiency when combined with washcoat loading ranges from about 24 to 120 g/liter, and in some embodiments may even be more advantageous when combined with washcoating levels of 30-100 g/liter, or in other embodiments 30-80 g/liter, or in other embodiments 80-120 g/liter.

In various embodiments, a gasoline particulate filter disclosed herein which exhibits a suitably low pressure drop performance, and in some embodiments low enough to replace three-way catalyst substrates, or be part of a gasoline exhaust after treatment system without a three-way catalyst substrate. The GPF comprises porous ceramic walls having a microstructure described herein which helps to provide low soot-loaded pressure drop from 0.3 to 1.0 g/liter of soot with washcoat loadings in some embodiments >24 g/liter, in some embodiments >30 g/liter, in some embodiments >50 g/liter or even >75 g/liter; this range of soot load is particularly relevant for gasoline applications given the high exhaust temperatures and fuel cut events which remove soot on a frequent basis. For example, the low soot-loaded pressure drop can permit higher washcoat load capacity for the same backpressure. As the GPF comprises a porous ceramic with the narrow pore size distribution disclosed herein, the pressure drop is fairly insensitive to washcoat loads in this regime.

The particulate filter disclosed herein can effectively trap soot particles. In moderate washcoat load ranges, the microstructure can dominate the filtering performance rather than the washcoat. In some embodiments, the articles disclosed herein comprise a microstructure which provides >80% filtration efficiency at 0.025 g/liter of soot and >95% FE for soot loading of 0.055 g/liter. Thus, high trapping efficiencies can be achieved even with very small amounts of soot loaded into the filter. In some embodiments, a coated particulate filter is disclosed herein comprising a washcoat loading between about 24 g/liter and 120 g/liter, an overall (washcoated) CTE<$12\times10$-7/° C., and a filtration efficiency (FE)>80% at a loading of 0.025 g/liter of soot.

In another aspect, a high porosity cordierite material is disclosed herein which is capable of delivering low pressure drop and high filtration efficiency for gasoline emissions applications. In some embodiments, a cordierite forming batch mixture is extruded through an extrusion die to form a green body comprised of a matrix of intersecting walls, such as a honeycomb structure, wherein the green body is fired to form a ceramic structure comprised primarily of cordierite; in some embodiments a ceramic wall-flow honeycomb filter is formed with plugs disposed in at least some of the channels at one end, or at least some of the channels at the opposite end, or both such as alternating channels plugged on each end face. The filter can be designed to be coated such as with the washcoat, but could alternatively be utilized as a bare (uncoated) filter. Preferably the ceramic structure is comprised of porous ceramic material, wherein the walls are porous to allow gas flow through the wall and to provide washcoat capacity within the wall. Preferably the porosity is >60% and median pore diameter is between about 16 and 20 μm. In one exemplary filter, the wall or cell geometry is 300 cpsi and 8 mil wall thickness to provide fast light-off of catalyst and low pressure drop; although walls have high porosity and thin web thickness, the overall filter body has sufficient mechanical strength to withstand forces imposed during canning of the filter body. In some embodiments, the modulus of rupture for such filter body is >180 psi. Furthermore, the porous cordierite material has good thermal shock resistance with CTE (25-800 C) of $\leq 10\times10$-7/° C. In other embodiments, thicker walls, for example from 8 to 12 mil, can be used for very high filtration efficiency applications, such as for GDI engines with extremely high particle number (PN) emissions.

In various embodiments, a cordierite forming batch mixture disclosed herein is prepared by combining alumina, talc and clay (as inorganic cordierite-forming components) mixed with one or more pore former components and organic components. Various exemplary, non-limiting, cordierite forming batch mixtures are listed in Tables 1-3.

The inorganic components and pore formers were mixed with 2 to 6% methylcellulose binder and 0.5 to 1.0% sodium stearate. An extrudable batch (sometimes referred to as a plasticized batch) was generated by adding a solvent, here water, to this mixture and then worked, for example in a Muller followed by ram extrusion, or by blending in a plough mixer and followed by extrusion with a twin screw extruder. The mixture was extruded through an extrusion die, such as a 300 cell per square inch density, 8 mil wall thickness slot die to form a 2" or 4.66" diameter honeycomb, which was dried and fired to, in some embodiments, 1415° C. to 1435° C., held at that temperature for 8 to 15 hours and then cooled to room temperature. The primary crystalline constituent was cordierite at >85% with total minor crystalline phases of <15%, which included spinel, sapphirine and mullite as measured by X-ray diffraction; as used herein, a cordierite body, or cordierite article, etc, is one which comprises greater than 85% crystalline cordierite.

Embodiments comprising high wall permeability preferably have a narrow pore size distribution with df<0.40 and db on the coarse end<1.15. FIG. 1 shows the pore size distribution as measured by mercury porosimetry of a comparative high porosity material in 300 cpsi 8 mil wall versus the material disclosed herein, which has a lower d90 and d50 than the comparative material and which is beneficial for filtration efficiency. The article disclosed herein has a significantly tighter distribution and a lower d50 than the comparative article for improved filtration. In addition the d10 of the material disclosed herein is higher than the comparative material, which helps to reduce pressure drop for a coated filter.

Table 2 lists batch mixtures that can produce the articles disclosed herein while Table 4 lists batch mixtures of comparative articles.

TABLE 2

Batch Composition Mixtures - Exemplary Embodment Samples

| | Composition Number | | | | | | | | | | |
|---|---|---|---|---|---|---|---|---|---|---|---|
| | 1 | 2 | 3 | 4 | 5 | 6 | 7 | 8 | 9 | 10 | 11 |
| Talc A | 17.35 | 19.94 | 19.24 | 29.45 | 28.47 | 38.68 | 29.46 | 38.56 | 39.24 | 19.94 | 39.16 |
| Talc B | 21.41 | 19.93 | 19.23 | 9.82 | 10.8 | 0 | 9.82 | 0 | 0 | 19.93 | 0 |
| Alumina A | 13.95 | 13.19 | 8.24 | 14.44 | 16.82 | 9.18 | 11.19 | 12.88 | 13.28 | 13.19 | 12.86 |
| Alumina B | 0 | 6.59 | 4.12 | 2.38 | 0 | 4.59 | 5.59 | 0 | 3.32 | 6.59 | 3.21 |
| Alumina Hydroxide A | 18.6 | 10.2 | 12.38 | 15.4 | 13.09 | 19.8 | 15.0 | 12.9 | 15 | 10.2 | 15 |
| Alumina Hydroxide B | 0 | 0 | 7.42 | 0 | 2.31 | 0 | 0 | 6.22 | 0 | 0 | 0 |

TABLE 2-continued

Batch Composition Mixtures - Exemplary Embodiment Samples

| | Composition Number | | | | | | | | | | |
|---|---|---|---|---|---|---|---|---|---|---|---|
| | 1 | 2 | 3 | 4 | 5 | 6 | 7 | 8 | 9 | 10 | 11 |
| Kaolin | 13.39 | 14.9 | 14.9 | 12.5 | 12.5 | 11.7 | 13.3 | 14.9 | 13.7 | 14.9 | 14.9 |
| Quartz A | 15.3 | 0 | 0 | 0 | 0 | 0 | 0 | 14.54 | 0 | 1.52 | 0 |
| Quartz B | 0 | 0 | 0 | 0 | 0 | 0 | 0 | 0 | 0 | 0 | 0 |
| Quartz C | 0 | 15.25 | 14.47 | 16.01 | 16.01 | 16.05 | 15.64 | 0 | 15.46 | 13.73 | 14.87 |
| Graphite A | 15 | 12.5 | 12.5 | 17.5 | 17.5 | 17.5 | 12.5 | 17.5 | 12.5 | 12.5 | 12.5 |
| Starch A | 24 | 25.5 | 25.5 | 22.5 | 22.5 | 22.5 | 25.5 | 0 | 22.5 | 25.5 | 25.5 |
| Starch B | 0 | 0 | 0 | 0 | 0 | 0 | 0 | 22.5 | 0 | 0 | 0 |

Figure 2A:
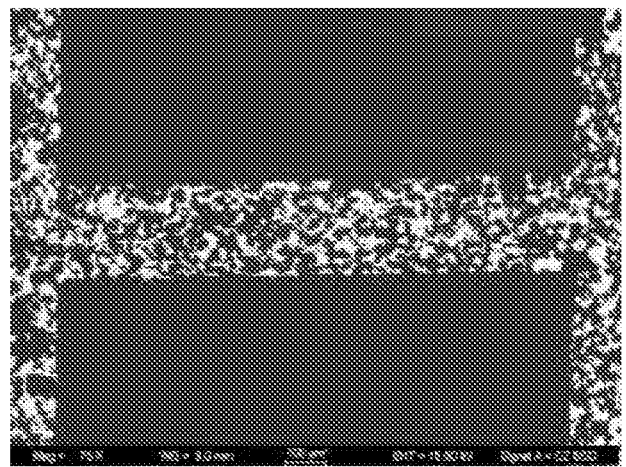
FIGS. 2a and 2b are SEM images of a porous ceramic article made of the porous ceramic material "A" of FIG. 1 and the comparative porous ceramic material "B" of FIG. 1, respectively.
Figure 2B:
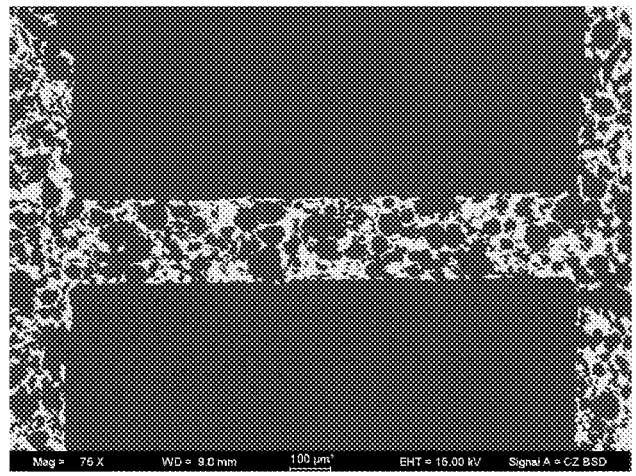
Figure 3A:
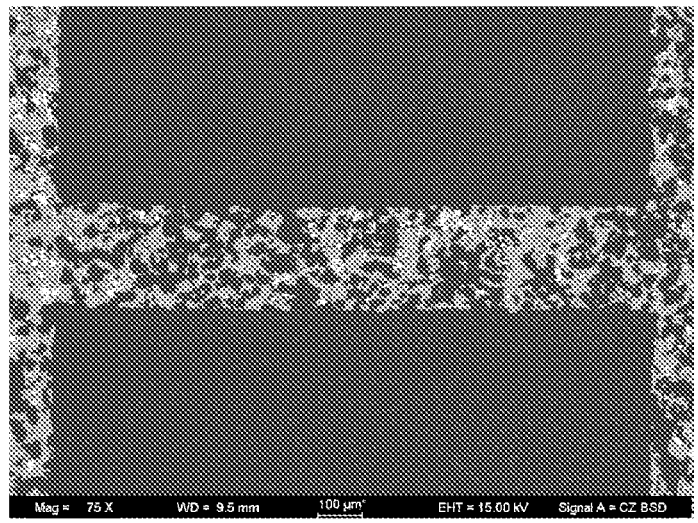
FIGS. 3a and 3b are SEM images of porous ceramic material "A" and comparative "B", respectively, both with 80 g/l TWC washcoat.
Figure 3B:
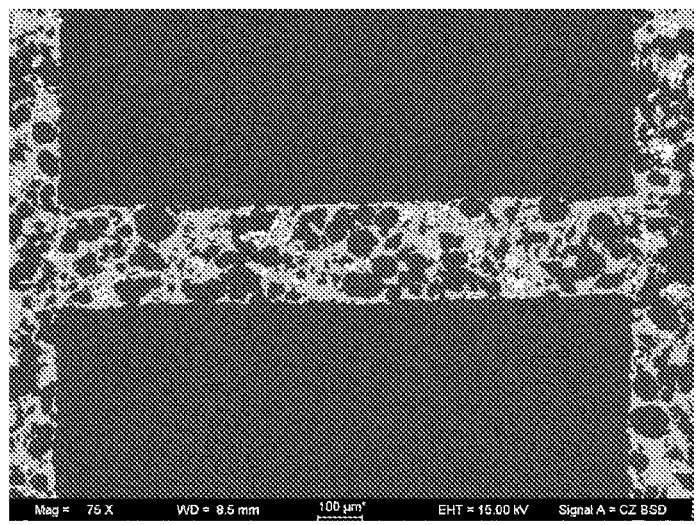

SEM images of an article disclosed herein and a comparative article, both having the same cross-sectional geometry of 300 cpsi, 8 mil walls are shown in FIGS. 2a and 2b. The article disclosed herein has a well-connected and uniform microstructure which leads to high wall permeability and high filtration efficiency. The comparative sample shows a greater number of larger pores which result in lower filtration efficiency. Both Hg porosimetry and SEM data show a tighter pore size distribution for articles disclosed herein; such microstructures are well-suited for moderate washcoat loadings (e.g. 50-100 g/l). FIGS. 2a and 2b also show a more uniform and well-connected microstructure for the article disclosed herein than the comparative article; also, there are fewer coarse pores in the article disclosed herein, which correlates with results from Hg porosimetry. Finer inorganic materials and pore formers were utilized to achieve a narrow pore size distribution. We observed that the same advantages of tighter distribution were present in the bare state as well as after coating. FIG. 3 shows cross-sectional SEM micrographs of the comparative filter and a representative exemplary filter disclosed herein, both after coating with a three way catalytic (TWC) washcoat to 80 g/l; the article disclosed herein maintained a well-connected microstructure after coating where the washcoat fills the pores throughout the wall, providing improved access of the exhaust gas to the washcoat and catalyst; also, it can be seen in FIG. 3 that coating fills the microstructure disclosed herein more uniformly across the wall.

Figure 4:
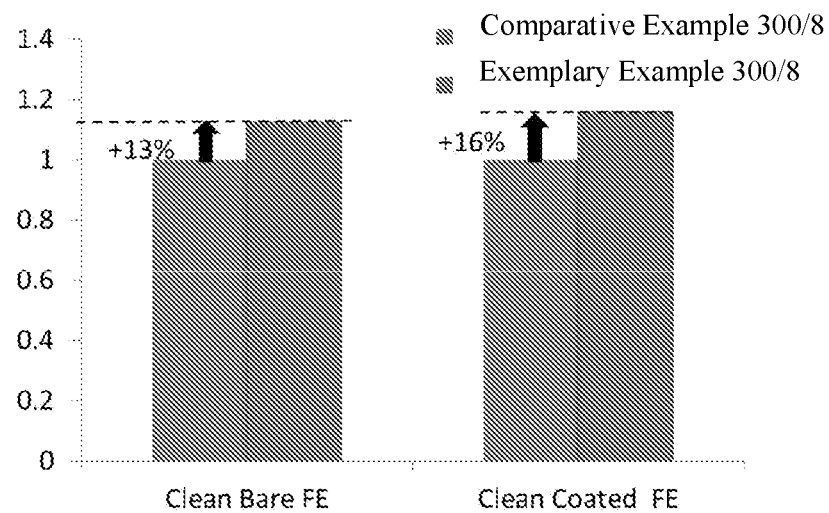
FIG. 4 schematically illustrates the differences in filtration efficiency between a particulate filter made of material "A" disclosed herein and a particulate filter made of comparative material "B", both in the bare and coated states.

Preferably, the resulting microstructure of the materials, and/or articles, and/or methods disclosed herein comprise lower porosity and smaller d50 even after coating, for example by a catalytic washcoat, such as for coated honeycomb structures or bodies, compared to the bare (uncoated) material or structures or bodies. The relatively smaller d50 and d90 disclosed in connection with embodiments herein translates into higher filtration efficiency relative to comparative articles in both bare and coated states. Particulate filters comprising cylindrical bodies comprising honeycomb structures with selectively plugged cells are channels, with diameter of 4.66" and axial length of 6" along the channels were tested on a laboratory filtration rig which used a commercial soot generator producing 100 nm soot and measured particle mass and number upstream and downstream of the inline filter. Particle mass was measured with a smoke meter and microsoot sensor and particle number with a CPC and EEPS device. The test was conducted at steady state room temperature at 374 slpm (standard liters per minute). FIG. 4 illustrates an improvement of approximately 13-16% in clean (e.g. no soot) filtration efficiency for bare and coated for the exemplary article disclosed herein versus the comparative article. Both filters were coated to ~80 g/l with a TWC washcoat. Preferably, pores at or near the surface of the walls comprise pores large enough to accommodate, or even fully accommodate, the washcoat within the wall, but small enough to capture gasoline particulate matter, i.e. particulate matter generated by a gasoline engine such as a GDI engine, for the GPF's disclosed herein, as was the case for the exemplary embodiment of the present disclosure shown in FIG. 4.

Figure 5:
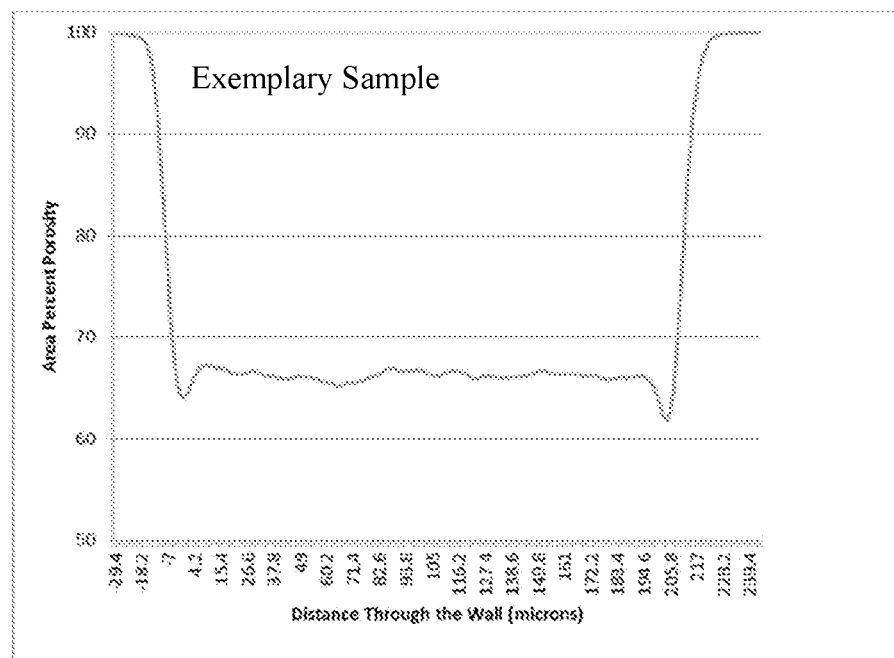
FIG. 5 is an X-ray tomography image trace displaying porosity from one end of a wall of a particulate filter made of material "A" to the other end of the wall.

Preferably, the resulting microstructure of the materials, and/or articles, and/or methods disclosed herein comprise a low fine df such as to improve coated pressure drop, as well as a high porosity at the surface of the walls, for example in the outermost 10-20 μm of wall. Wall permeability increases with higher porosity and if porosity is low at the surface compared to the bulk, pressure drop will be higher. Porosity through the wall for the exemplary articles disclosed herein and the comparative articles was measured using tomography. FIG. 5 shows a reduction in porosity (about 4%) for the exemplary article at the surface compared to bulk; as seen in FIG. 5, the article disclosed herein the bulk porosity values are similar to the surface porosity values. Porosity was measured across four walls; the measured porosities were within about 1 to 2% of each other, as shown in Table 6.

TABLE 6

| Exemplary Embodiment | Wall 1 | Wall 2 | Wall 3 | Wall 4 |
|---|---|---|---|---|
| Minimum % porosity in 1st 15 um of wall | 62.2 | 62.7 | 62.9 | 62.0 |
| Average % porosity in middle third of wall | 65.4 | 66.6 | 66.3 | 66.3 |

Figure 6:
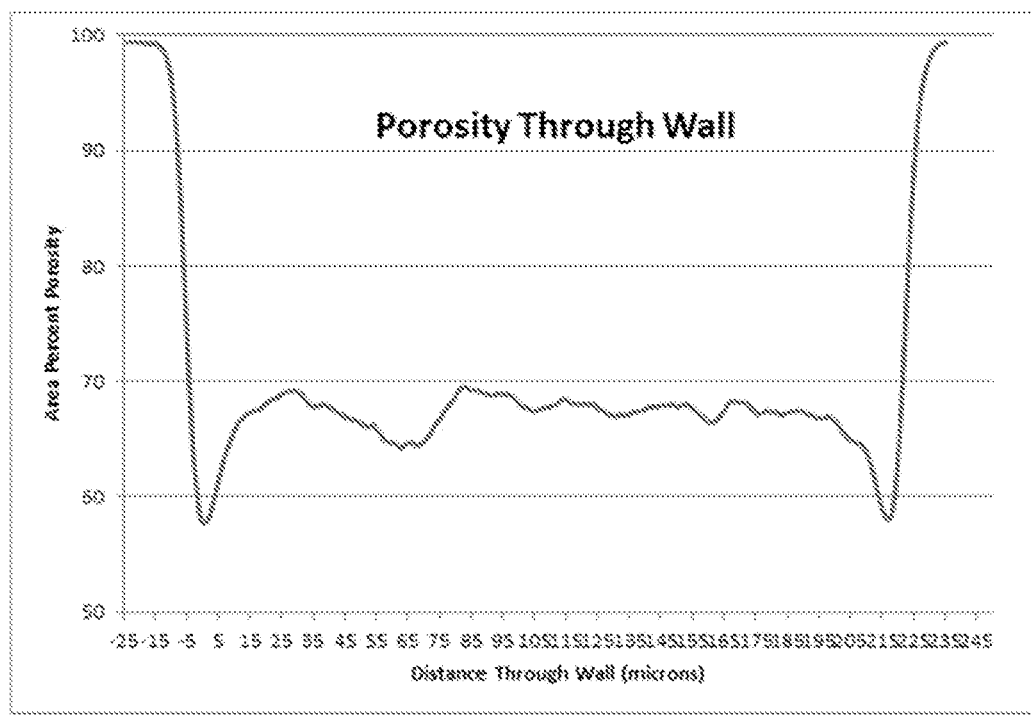
FIG. 6 is an X-ray tomography image trace displaying porosity from one end of a wall of a particulate filter made of comparative material "B" to the other end of the wall.

The measured porosity through the wall for comparative article is shown in FIG. 6, wherein the porosity at the surface of the wall decreases by about 11% compared to the bulk. On the other hand, the exemplary article of the present disclosure can be produced by utilizing a combination of finer inorganics and a finer narrow particle size pore former to obtain higher near surface porosity compared to known or comparative articles. It can be seen from FIG. 6 (and comparing to FIG. 5) that the comparative article has significantly lower porosity at the surface (e.g. both ends of the wall) than the bulk.

In various embodiments, one or more pore formers may be utilized in the formation of the porous ceramic articles disclosed herein. Batch mixtures may comprise highly cross-linked starch pore formers, such as with median pore size<45 μm. In some embodiments, the batch mixture preferably comprises pea starch, and may comprise highly cross-linked potato starch instead of or in addition to the pea starch. Preferably the starch pore former(s) has a narrow particle size distribution; thus, other starches may be utilized by taking advantage of classification methods that may be employed to reduce or narrow the particle size distribution of any starch. Other pore formers may be utilized, either singly or in combination, to produce narrow pore distributions, such as found in US2007/0119135, which is incorporated herein in its entirety.

In various embodiments disclosed herein the article comprising porous ceramic partition walls (such as the intersecting matrix of walls of a honeycomb structure) comprises porosity in the near surface region of one or more walls that is ≤5% lower (or not more than 5% lower) than the porosity value in a region near the center of the cell partition wall.

In various embodiments disclosed herein the material or article comprises high surface porosity cordierite, and is manufactured utilizing fine inorganics such as silica and talc, but with coarse pore former, such as highly cross-linked potato, in the cordierite forming batch mixture which is extruded, dried, and fired into a porous cordierite material or article.

In various embodiments disclosed herein, the particulate filter both delivers high filtration efficiency and maintains low pressure drop, as illustrated by pressure drop testing. Pressure drop was measured on a laboratory rig at 210 scfm (standard cubic feet per minute) and room temperature. Artificial soot, Printex-U, was introduced into the filter at a series of flow rates up to 210 scfm. To compare pressure drop response, both filters disclosed herein as well as comparative filters, each having 300 cpsi 8 mil cell geometry, were coated with 80 g/l washcoat.

Figure 7:
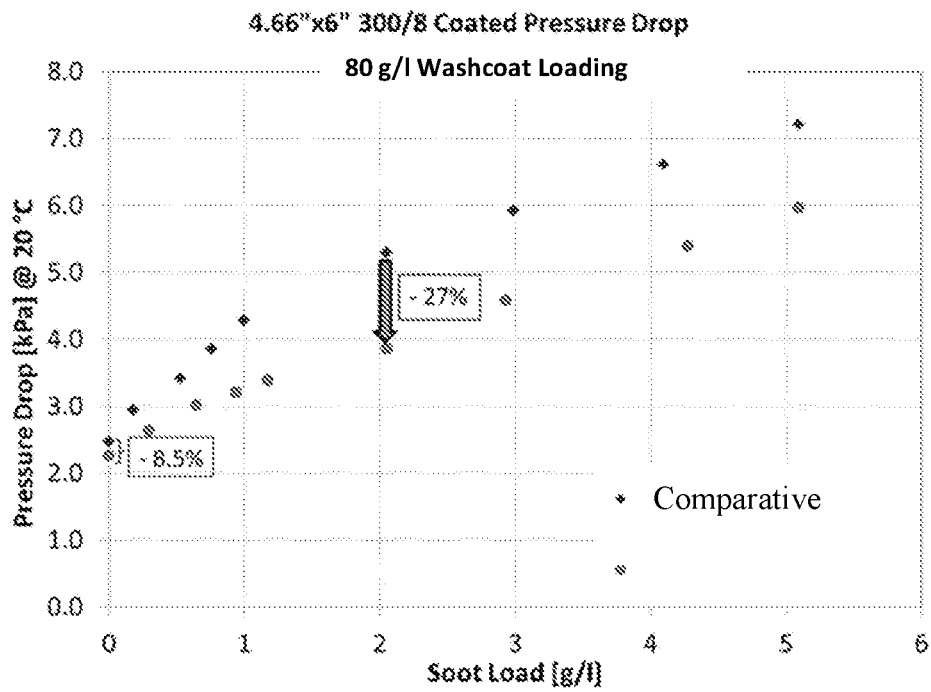
FIG. 7 shows the measured coated pressure drop of a 300/8 filter made of material "A" compared to a comparative 300/8 filter made of material "B", wherein each filter was coated with about 80 g/l internal coating.

FIG. 7 shows the backpressure response as a function of soot loading at 210 scfm wherein the filter disclosed herein provides an advantaged coated pressure drop in both clean and soot-loaded states; a shallower increase in pressure drop with soot loading can be seen, which we believe is due to its narrow pore size distribution, specifically its higher d10. That is, the filter disclosed herein has lower clean and soot-loaded pressure drop than the comparative filter which we believe is due to the combined higher d10 and lower surface-to-bulk porosity difference. In use, there may be some instances when exhaust temperature (for example gasoline engine exhaust temperatures) is not sufficiently high to oxidize soot; thus low pressure drop is desired to maintain engine performance.

Figure 8:
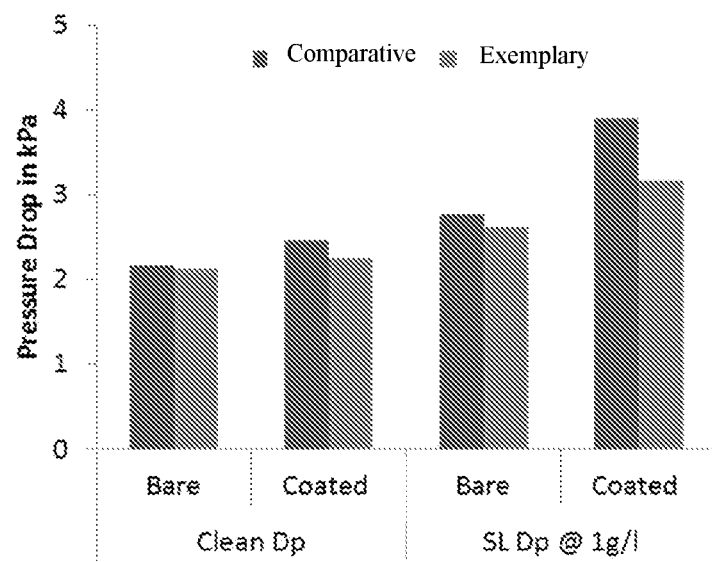
FIG. 8 shows the measured bare and coated pressure drop of the filter of material "A" and comparative filter of material "B", both bare and with 1 g/l soot load.
Figure 9:
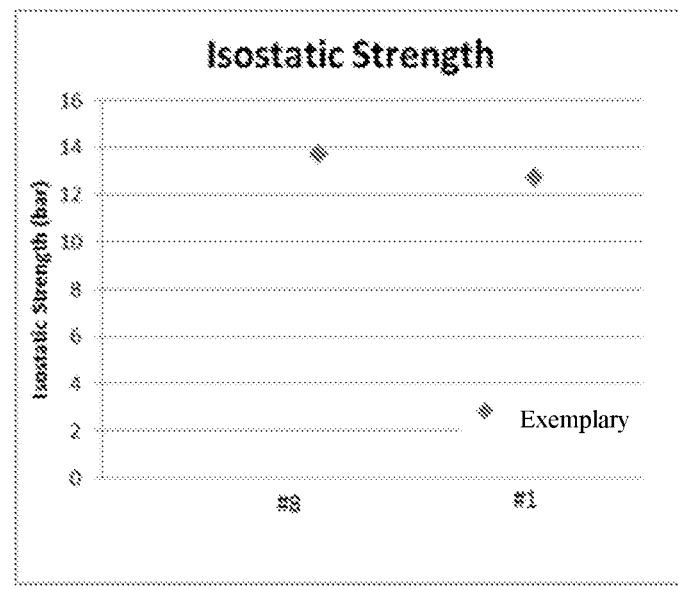
FIG. 9 shows the measured isostatic strength of particulate filters made from Composition 1 and Composition 8, respectively, both as disclosed herein, in 300/8 cell geometry.

In various embodiments disclosed herein, the particulate filter is also less sensitive to coating, such as with a catalytic washcoat, than comparative filters, as illustrated in FIG. 8. Thus, more coating can be accommodated in the porosity in the porous ceramic walls of the filters disclosed herein while achieving similar, or even the same, levels of pressure drop, which in some embodiments may be the result of the combined high surface porosity and narrow pore size distribution of the material/article disclosed herein.

In various embodiments disclosed herein, a high porosity cordierite material is provided to deliver low pressure drop and high filtration efficiency such as for gasoline emissions applications. The batch mixture material can be extruded and then fired and plugged as a ceramic wall-flow honeycomb filter with alternating channels plugged on each end face. The ceramic material can be used in coated applications but can instead be used as a bare filter. The walls of the honeycomb structure are porous to allow gas flow through the wall and in some embodiments to provide washcoat capacity within the wall. Preferably the bulk porosity is >60% and median pore diameter is between about 16 and 20 μm. One exemplary cell geometry is 300 cpsi and 8 mil wall thickness to provide fast light-off of catalyst and low pressure drop. In these embodiments, although this material has high porosity and thin web thickness, it has sufficient mechanical strength for canning. The modulus of rupture in these embodiments is >180 psi. The material also has good thermal shock resistance with CTE (25-800 C) of ≤10×10-7/° C. In some embodiments, walls of 10, 11, 12 mil or greater may be provided such as for very high filtration efficiency applications. In various embodiments, the material is provided for a GPF for service with GDI engines with extremely high PN emissions.

In various embodiments disclosed herein, the material and/or articles are made by combining alumina, talc and clay (for forming cordierite) mixed with pore former and organic components. Some batch mixtures for forming cordierite are shown as examples but are not limited to those listed in Tables 1-3. In some embodiments, the inorganic components and pore formers are mixed with 2 to 6% methylcellulose binder and 0.5 to 1.0% sodium stearate. A plasticized batch is generated by adding water to this mixture and working it in a muller followed by ram extrusion, or by blending in a plough mixer and followed by extrusion with a twin screw extruder. Such mixture is extruded, for example, through a 300 cells per square inch density 8 mil wall slot die to form a honeycomb, in some examples 2" or 4.66" diameter, which is dried and fired to 1415° C. to 1435° C., held at that soak temperature for 8 to 15 hours and then cooled to room temperature. The primary crystalline constituent is preferably cordierite at >85% with total minor crystalline phases of <15%, which include spinel, sapphirine and mullite as measured by X-ray diffraction.

In various embodiments, the pore size distribution is narrow with df<0.40 and db on the coarse end<1.15, such as to achieve high wall permeability. FIG. 1 shows the pore size distribution measured by mercury porosimetry of a comparative high porosity material in 300 cpsi 8 mil wall as well as the material disclosed herein, which has a lower d90 and d50 than the comparative material and which is beneficial for filtration efficiency. In addition the d10 of the material of the material disclosed herein is higher than the comparative material, which improves pressure drop for a coated filter.

Embodiments of the present disclosure include a cordierite ceramic body that may be used as a gasoline particulate filter, diesel particulate filter and/or as a substrate support for catalytic materials, such as wall-flow filter or flow-through substrate.

Figure 10:
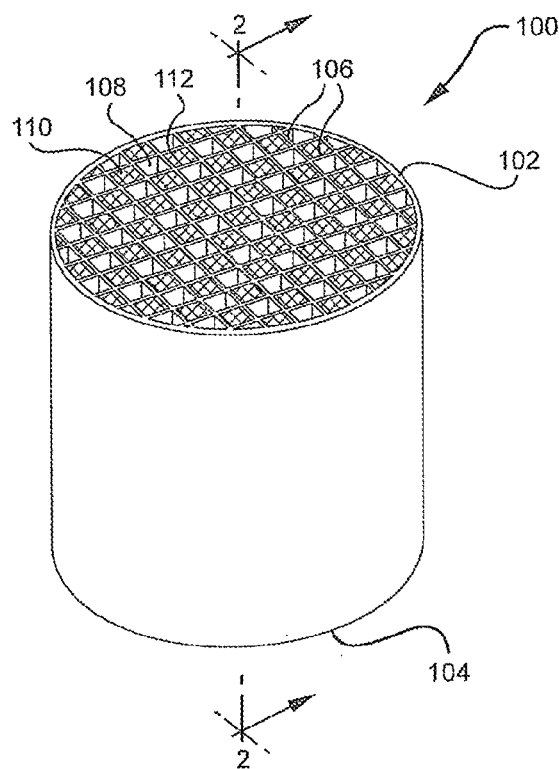
FIG. 10 shows an isometric schematic view of a ceramic body in the form of a filter (100) according to an embodiment disclosed herein.
Figure 11:
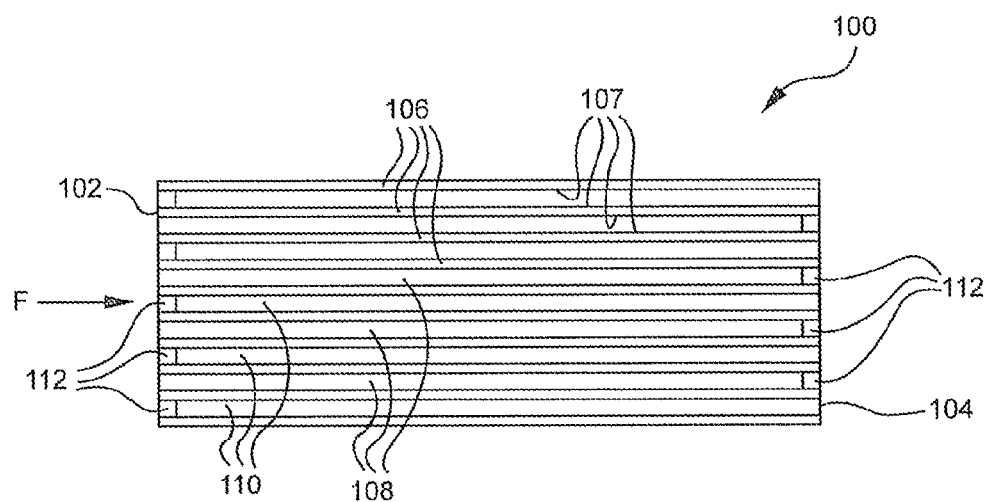
FIG. 11 shows a cutaway view of the filter of FIG. 10.

Depicted in FIG. 10 is a ceramic body (100) according to one or more embodiments shown and described herein. The cordierite ceramic body (100) may generally have a honeycomb structure (105) comprising a plurality of intersecting channel walls (115) defining parallel channels (110) extending in an axial direction between an inlet end (130) and an outlet end (135).

Preferably, the particulate filter provides sufficiently high filtration capability and preferably does not significantly increase pressure drop, for example to maintain high power performance. Depending on the level of catalyst functionality required for gaseous emissions reduction, a gasoline particulate filter (GPF) may be positioned close-coupled to the engine (such as with turbo) or under the floor or carriage. For full or partial three-way catalysts (TWC) functionality applications, a high porosity body is desired. For bare or lightly coated applications, a lower porosity material can be sufficient.

The filters, such as GPFs, disclosed herein can comprise one component in a multi-component after treatment system that can comprise honeycomb supported three-way catalysts, NOx adsorbing systems, and polishing catalysts. In some embodiments, the system can be simplified by combining multiple functionalities on one or more components, for example placement of a three-way catalyst onto the GPF by application of a noble metal containing alumina or ceria-zirconia washcoat of 24 to 30 g/liter to about 120 g per liter of honeycomb. In some embodiments, the GPF disclosed herein can be suitable for ranges of about 30 to 80 g/liter, or even 30 to 100 g/liter of washcoat, which can help provide a sufficient filtration efficiency at a low back pressure and which has the isostatic strength to survive handling the canning process without chipping or structural failure. That is, in some embodiments the GPF disclosed herein may provide low back-pressure, high filtration efficiency, high canning strength, and sufficient thermal durability.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A particulate filter comprised of at least one porous ceramic wall, the wall comprising a microstructure comprising:
    average bulk porosity >62% as measured by mercury porosimetry,
    $d10>10$ µm,
    $d50>16$ µm,
    $df<0.40$,
    $d90<37$ µm, and
    surface porosity at the surface of the wall as measured by x-ray tomography is within 10% of an average mid-web porosity of the middle 30% of the wall, and wherein a minimum porosity measured at any point from the surface of the wall and perpendicularly into the wall to within 15 µm of the surface of the wall is at least 90% of the average porosity of the middle 30%.

2. The filter of claim 1 wherein the average bulk porosity as measured by mercury porosimetry is between 62 and 68%, inclusive.

3. The filter of claim 1 wherein d50 is between 17-20 µm, inclusive.

4. The filter of claim 1 wherein $d90<35$ µm.

5. The filter of claim 1 wherein $d90<30$ µm.

6. The filter of claim 1 wherein d90 is between 25-37 µm, inclusive.

7. The filter of claim 1 wherein the surface porosity as measured by x-ray tomography which is within 5% of the bulk porosity at midpoint of the wall.

8. The filter of claim 1 wherein the surface porosity as measured by x-ray tomography differs from the bulk porosity at midpoint of the wall by less than 10%.

9. The filter of claim 1 wherein the microstructure comprises $d10>11$ µm.

10. The filter of claim 1 wherein the filter further comprises a washcoat material disposed at least partially within the wall.

11. The filter of claim 10 wherein the washcoat material is comprised of three-way catalyst TWC material, SCR material, or a combination thereof.

12. The filter of claim 10 wherein the washcoat-loaded filter has a CTE which is within 10% of the uncoated porous ceramic wall.

13. The filter of claim 10 wherein the washcoat material is present with a washcoat loading of >30 g/l.

14. The filter of claim 10 wherein the washcoat material is present with a washcoat loading of >50 g/l.

15. The filter of claim 10 wherein the washcoat material is present with a washcoat loading of >75 g/l.

16. The filter of claim 10 wherein the washcoat material is present with a washcoat loading of between 30 and 120 g/l.

17. The filter of claim 10 wherein the washcoat material is present with a washcoat loading of between 50 and 120 g/l.

18. The filter of claim 10 wherein the washcoat material is present with a washcoat loading of between 75 and 120 g/l.

19. The filter of claim 1 further comprising all of the washcoat material disposed below the surface of the porous ceramic wall.

20. The filter of claim 1 wherein the porous ceramic wall has a $(d50-d10)/d50<0.40$.

21. The filter of claim 1 wherein the porous ceramic wall has a $(d90-d50)/d50<1.15$.

22. The filter of claim 1 wherein the porous ceramic wall has a wall thickness >40 µm.

23. The filter of claim 1 wherein the filter comprises a matrix of porous ceramic walls.

24. The filter of claim 1 wherein the filter comprises a honeycomb matrix of porous ceramic walls.

25. A honeycomb filter body comprised of at least one porous ceramic wall, the wall comprising a microstructure comprising:
    total porosity 63-67% as measured by mercury porosimetry,
    d50 of 16 to 19 µm, inclusive,
    $d90<37$ µm,
    $df<0.40$ and
    surface porosity at the surface of the wall as measured by x-ray tomography is within 10% of an average mid-web porosity of the middle 30% of the wall, and wherein a minimum porosity measured at any point from the surface of the wall and perpendicularly into the wall to within 15 µm of the surface of the wall is at least 90% of the average porosity of the middle 30%.

26. The honeycomb filter body of claim 25 wherein the minimum porosity measured at any point from the surface of the wall and perpendicularly into the wall to within 15 µm of the surface of the wall is at least 95% of the average porosity of the middle 30%.

27. The filter of claim 1 wherein the minimum porosity measured at any point from the surface of the wall and perpendicularly into the wall to within 15 µm of the surface of the wall is at least 95% of the average porosity of the middle 30%.

* * * * *